US012744833B1

(12) United States Patent
Peebler

(10) Patent No.: US 12,744,833 B1
(45) Date of Patent: Sep. 22, 2026

(54) CONTENT CONSUMPTION FEEDBACK

(71) Applicant: Apple Inc., Cupertino, CA (US)

(72) Inventor: Bradley W. Peebler, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/898,274

(22) Filed: Sep. 26, 2024

Related U.S. Application Data

(60) Provisional application No. 63/541,673, filed on Sep. 29, 2023.

(51) Int. Cl.
*H04N 21/442* (2011.01)
*H04L 67/50* (2022.01)

(52) U.S. Cl.
CPC ..... *H04L 67/535* (2022.05); *H04N 21/44204* (2013.01); *H04N 21/44222* (2013.01)

(58) Field of Classification Search
CPC ............ H04L 67/535; H04N 21/44204; H04N 21/44222
See application file for complete search history.

(56) References Cited

U.S. PATENT DOCUMENTS

| | | | | |
|---|---|---|---|---|
| 9,491,176 | B1 * | 11/2016 | Jaini | H04L 63/10 |
| 2014/0351846 | A1 * | 11/2014 | Dang | H04N 21/44236 725/28 |
| 2016/0050446 | A1 * | 2/2016 | Fujioka | G06F 16/9535 725/93 |
| 2016/0309231 | A1 * | 10/2016 | Jaini | H04N 21/4755 |
| 2016/0379123 | A1 * | 12/2016 | Younessian | G06Q 30/0201 706/52 |
| 2017/0251263 | A1 * | 8/2017 | Jaini | H04N 21/4532 |
| 2018/0063263 | A1 * | 3/2018 | Bandela | H04N 21/44224 |
| 2019/0347180 | A1 * | 11/2019 | Cranfill | H04L 12/14 |
| 2019/0354943 | A1 * | 11/2019 | Mulye | H04N 21/44204 |
| 2022/0132208 | A1 * | 4/2022 | Garg | H04N 21/6547 |
| 2023/0362424 | A1 * | 11/2023 | Bates | H04N 21/4532 |
| 2024/0080519 | A1 * | 3/2024 | Nagra | H04N 21/44008 |
| 2024/0232414 | A9 * | 7/2024 | Day, II | H04L 63/108 |
| 2024/0422258 | A1 * | 12/2024 | Gottfurcht | H04L 67/535 |
| 2025/0337984 | A1 * | 10/2025 | Karkis | H04N 21/43615 |

* cited by examiner

*Primary Examiner* — John R Schnurr
(74) *Attorney, Agent, or Firm* — Fernando & Partners, LLP

(57) ABSTRACT

In one implementation, a method of providing feedback regarding content consumption is performed at a device including a display, one or more processors, and non-transitory memory. The method includes receiving, from a user, input defining a first content consumption preference that specifies a preferred amount of content of a first type. The method includes transmitting, to a first content provider, data indicative of the first content consumption preference. The method includes determining an amount of content of the first type from the first content provider consumed by the user. The method includes providing, to the user, feedback regarding the amount of content of the first type from the first content provider consumed by the user.

20 Claims, 7 Drawing Sheets

CONTENT CONSUMPTION FEEDBACK

CROSS-REFERENCE TO RELATED APPLICATIONS

This application claims priority to U.S. Provisional Patent App. No. 63/541,673, filed on Sep. 29, 2023, which is hereby incorporated by reference in its entirety.

TECHNICAL FIELD

The present disclosure generally relates to user interfaces for providing feedback regarding content consumption.

BACKGROUND

Various applications present content for user consumption. In various applications, the content presented for user consumption is based on a recommendation engine that selects content based on a user engagement with previously presented content. However, over time, such a recommendation engine generally tends to select content that a user subconsciously prefers to consume rather than content that a user would consciously prefer to consume.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
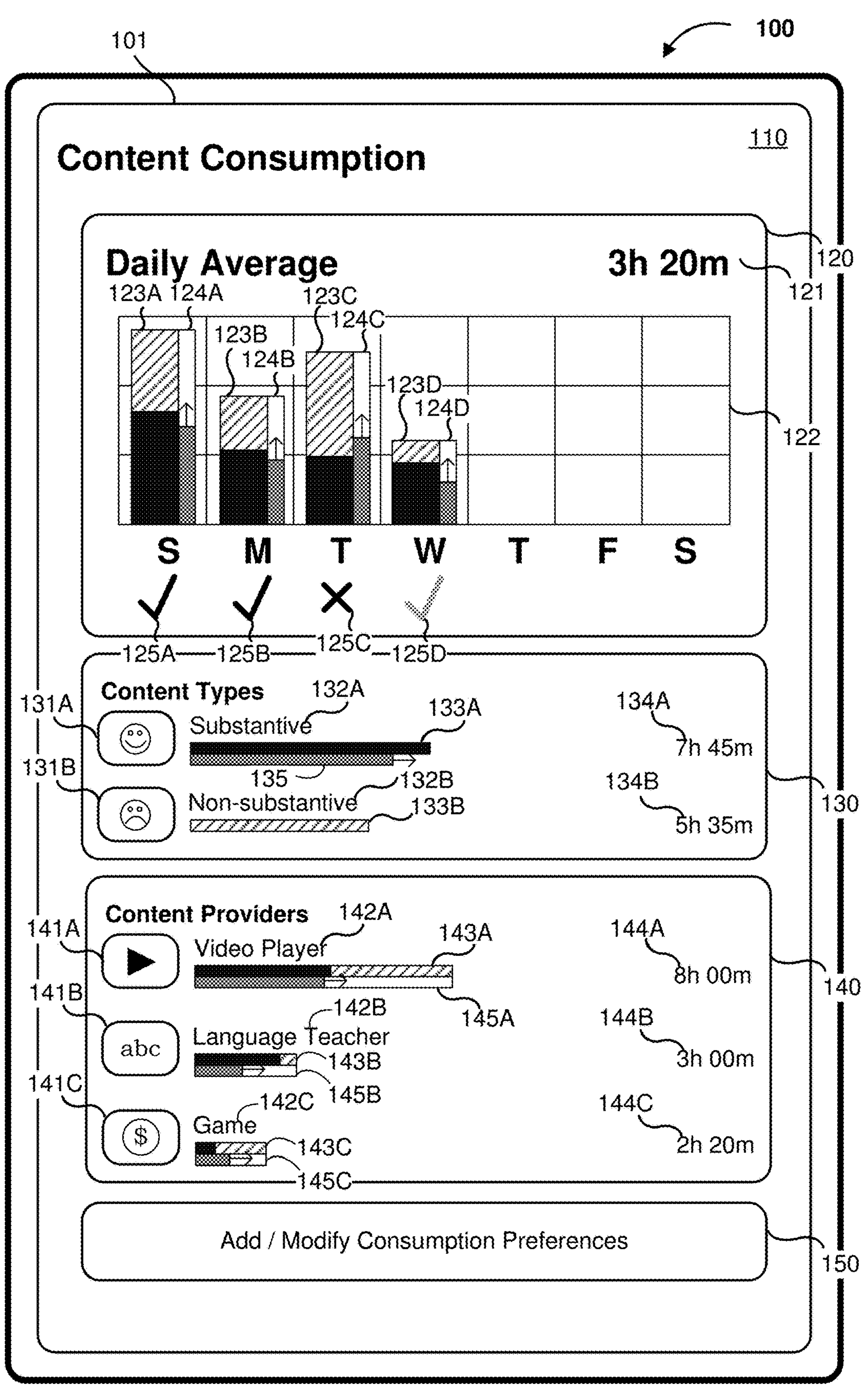
FIGS. 1A-1D illustrates a graphical user interface for providing feedback regarding content consumption in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for providing feedback regarding content consumption. In various implementations, the method is performed at a device including a display, one or more processors, and non-transitory memory. The method includes receiving, from a user, input defining a first content consumption preference that specifies a preferred amount of content of a first type. The method includes transmitting, to a first content provider, data indicative of the first content consumption preference. The method includes determining an amount of content of the first type from the first content provider consumed by the user. The method includes providing, to the user, feedback regarding the amount of content of the first type from the first content provider consumed by the user.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

FIG. 1A illustrates an electronic device 100 including a display 101 displaying a graphical user interface 110 for providing feedback regarding content consumption in accordance with some implementations.

The graphical user interface 110 includes a days region 120. The days region 120 includes an average consumption indicator 121 that indicates the average amount of content the user has consumed each day of a current week. In various implementations, a user consumes content by reading text (such as a website or news article), listening to audio (such as music, podcasts, or audiobooks), viewing images, watching video, or playing a game. It is to be appreciated that this list is not exhaustive and a user can consume content in other ways, such as completing a language learning lesson, taking an interactive yoga class, singing a karaoke song, etc. In various implementations, the amount of content the user has consumed is the amount of time the user has spent consuming the content. In various implementations, the amount of content the user has consumed is measured in other ways, such as a number of items of content a user has consumed, e.g., a number of news articles the user has read, a number of images the user has looked at, or a number of videos the user has watched.

The days region 120 includes a consumption graph 122 indicating the amount of content the user has consumed each day of the current week. The amount of content the user has consumed each day of the current week is represented by a plurality of daily consumption bars 123A-123D, one for each day of the current week. Each of the plurality of daily consumption bars 123A-123D has a size proportional to the amount of content the user has consumed on the respective day of the current week. Further, each of the plurality of daily consumption bars 123A-123D includes a plurality of portions, each portion having a size proportional to the amount of content of a respective type the user has consumed on the respective day of the current week. For example, in FIG. 1A, the first daily consumption bar 123A includes a first portion (colored black) of a first size indicating the amount of content of a first type the user has consumed on the first day of the current week and a second portion (patterned with slashes) of a second size indicating the amount of content of a second type the user has consumed on the first day of the current week.

Although FIG. 1A illustrates each of the plurality of daily consumption bars 123A-123D with two portions, it is to be appreciated that, in various implementations, each of the plurality of daily consumption bars 123A-123D may have more than two portions corresponding to more than two types of content.

In various implementations, the user provides user input indicative of one or more consumption preferences. For example, the user may provide user input indicative a consumption preference that the amount of content of a particular type consumed by the user be less than or greater than a preferred amount. The preferred amount may be specified as an absolute value (e.g., 30 minutes/day) or a percentage (e.g., 50 percent). For example, in FIG. 1A, the user has provided user input indicative of a first consumption preference that the amount of content of the first type consumed by the user is at least 50 percent of the amount of content consumed by the user. Accordingly, the consumption graph 122 includes a plurality of first-type daily consumption percent sidebars 124A-124D respectively associated with each of the plurality of daily consumption bars 123A-123D.

Each of the plurality of first-type daily consumption percent sidebars 124A-124D has a size proportional to the amount of content the user has consumed on the respective day of the current week. Further, a portion of each of the plurality of first-type daily consumption percent sidebars 124A-124D is shaded, the size of the portion being the preferred amount of the first consumption preference (e.g., 50 percent). Each of the plurality of first-type daily consumption percent sidebars 124A-124D also include an arrow pointing up to indicate that first consumption preference specifies a greater-than preference. Thus, for example, by comparing the size of the portion corresponding to the first type of content in the first daily consumption bar 123A to the size of the shaded portion of the first first-type daily consumption percent sidebar 124A, a user can quickly determine whether the first consumption preference has been met on the first day of the current week.

The days region 120 includes a plurality of consumption checks 125A-125D respectively associated with the plurality of daily consumption bars 123A-123D. Each of the plurality of consumption checks 125A-125D indicates whether the amounts of content consumed by the user on a respective day of the current week meets the one or more consumption preferences. For example, in FIG. 1A, the first consumption check 125A is a checkmark because the amount of content of the first type that the user consumed on the first day of the current week was more than 50 percent of the amount of content that the user consumed on the first day of the current week. Similarly, the second consumption check 125B is a checkmark because the amount of content of the first type that the user consumed on the second day of the week was more than 50 percent of the amount of content that the user consumed on the second day of the week. The third consumption check 125C is an X because the amount of content of the first type that the user consumed on the third day of the week was less than 50 percent of the amount of content that the user consumed on the third day of the week. The fourth consumption check 125D is a checkmark because the amount of content of the first type that the user consumed on the fourth day of the week was more than 50 percent of the amount of content that the user consumed on the fourth day of the week. Further, the fourth consumption check 125A is gray (as opposed to black like the first consumption check 125A, the second consumption check 125B, and the third consumption check 125C) because the fourth day of the week has not concluded, more content could be consumed by the user, and the one or more consumption preferences may be unmet.

The graphical user interface 110 includes a types region 130. The types region 130 includes a plurality of type representations representing a plurality of types of content. For example, the types region 130 includes a graphical representation of the first type of content 131A and a graphical representation of the second type of content 131B. As another example, the types region 130 includes a textual representation of the first type of content 132A and a textual representation of the second type of content 132B. The types region 130 further includes a plurality of type amount representations representing amounts of the plurality of types of content that the user has consumed during the current week. The types region 130 includes a textual representation of the amount of content of the first type 134A that the user has consumed during the current week and a textual representation of the amount of content of the second type 134B that the user has consumed during the current week.

The types region 130 also includes a plurality of graphical representations of the amounts of content of each type consumed by the user during the current week in the form of a plurality of type consumption bars 133A-133B. The size of each of the plurality of type consumption bars 133A-133B has a size proportional to the amount of content of the respective type that the user has consumed during the current week.

The types region 130 includes a type consumption sidebar 135 representing the first consumption preference. In particular, the type consumption sidebar 135 is displayed in association with the first type consumption bar 133A and has a size equal to what the first type consumption bar 133A would be if the user had consumed the preferred amount of content of the first type during the current week. The type consumption sidebar 135 includes an arrow pointing to the right indicating that the first consumption preference specifies a greater-than preference. Thus, for example, by comparing the size of the first type consumption bar 133A to the size of the type consumption sidebar 135, a user can quickly determine whether the first consumption preference has been met for the current week.

The graphical user interface 110 includes a providers region 140. The providers region 140 includes a plurality of provider representations representing a plurality of content providers. Each content provider may provide content via an application or a website. The providers region 140 includes a graphical representation of a first content provider 141A, a graphical representation of a second content provider 141B, and a graphical representation of a third content provider 141C. Further, the providers region 130 includes a textual representation of the first content provider 142A, a textual representation of the second content provider 142B, and a textual representation of the third content provider 142C. Although FIG. 1A illustrates only three content providers, it is to be appreciated that the number of content providers represented in the graphical user interface 110 can be any number.

The providers region 140 further includes a plurality of provider amount representations representing amounts of content that the user has consumed from each content provider during the current week. The providers region 140 includes a textual representation of the amount of content from the first content provider 144A that the user has consumed during the current week, a textual representation of the amount of content from the second content provider 144B that the user has consumed during the current week, and a textual representation of the amount of content from the third content provider 144C that the user has consumed during the current week.

The providers region 140 also includes a plurality of graphical representations of the amounts of content consumed by the user from each content provider during the current week in the form of a plurality of provider consumption bars 143A-143C. The size of each of the plurality of provider consumption bars 143A-143B has a size proportional to the amount of content from the respective content provider that the user has consumed during the current week. Each of the plurality of provider consumption bars 143A-143D includes a plurality of portions, each portion having a size proportional to the amount of content of a respective type that the user has consumed from the respective content provider during the current week. For example, in FIG. 1A, the first provider consumption bar 143A includes a first portion (colored black) of a first size indicating the amount of content of a first type the user has consumed from the first content provider during the current week and a second portion (patterned with slashes) of a second size indicating the amount of content of a second type the user has consumed from the second content provider during the current week.

Further, the providers region 140 includes a plurality of provider consumption sidebars 145A-145C respectively associated with each of the plurality of provider consumption bars 143A-143C. Each of the plurality of provider consumption sidebars 145A-145C has a size proportional to the amount of content the user has consumed from the respective content provider during the current week. Further, a portion of each of the plurality of provider consumption sidebars 145A-145C is shaded, the size of the portion being the preferred amount of content of the first type specified by the first consumption preference (e.g., 50 percent). Each of the plurality of provider consumption sidebars 145A-145C also includes an arrow pointing to the right to indicate that first consumption preference specifies a greater-than preference. Thus, for example, by comparing the size of the portion corresponding to the first type of content in the first provider consumption bar 143A to the size of the shaded portion of the first provider consumption sidebar 145A, a user can quickly determine whether the first consumption preference has been met by the first content provider during the current week.

Further, by looking at the providers region 140, a user can quickly determine the amount of content of each type that each content provider is contributing to a user's content consumption. For example, in FIG. 1A, the user consumes mostly content of the second type from the third content provider, mostly content of the first type from the second content provider, and a mix of content of the first type and content of the second type from the first content provider.

The graphical user interface 110 includes a consumption preferences affordance 150 which the user can activate to add or modify consumption preferences.

Figure 1B:
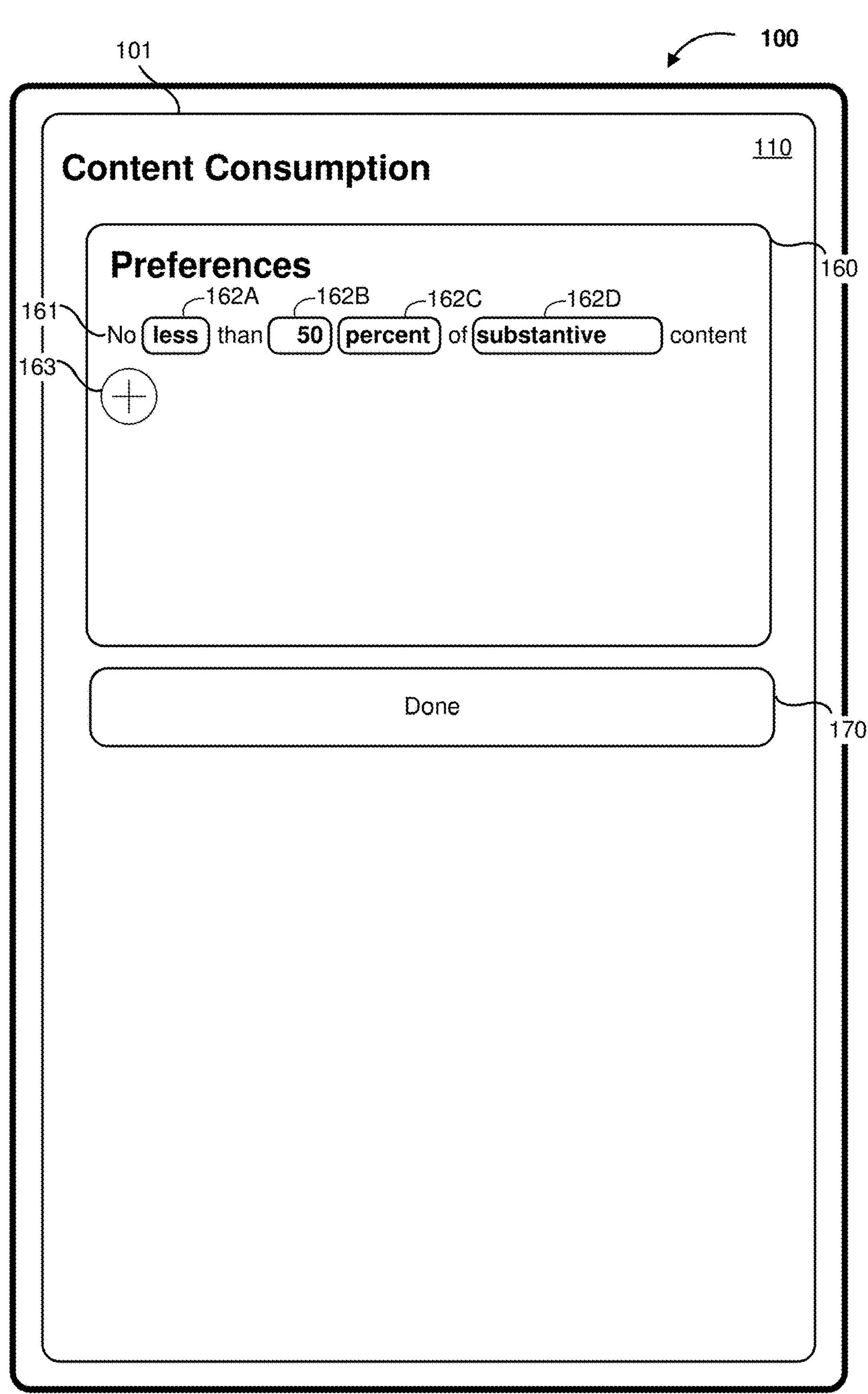

FIG. 1B illustrates the graphical user interface 110 in response to detecting activation of the consumption preferences affordance 150. In FIG. 1B, the days region 120, the types region 130, the providers region 150, and the consumption preferences affordance 150 are replaced by a preferences region 160 and a done affordance 170 which the user can activate to replace the preferences region 160 and the done affordance 170 with the days region 120, the types region 130, the providers region 150, and the consumption preferences affordance 150.

The preferences region 160 includes a representation of the first consumption preference 161. The representation of the first consumption preference 161 includes a plurality of modifiable elements 162A-162D representing aspects of the first consumption preference. For example, the representation of the first consumption preference 161 includes a greater-than/less-than element 162A allowing a user to select whether the first consumption preference specifies that the amount of content of the particular type is preferably greater than or less than the preferred amount. The representation of the first consumption preference 161 includes an amount element 162B allowing a user to select the preferred amount. The representation of the first consumption preference 161 includes an amount type element 162C allowing a user to select whether the preferred amount is an absolute value or a percentage. The representation of the first consumption preference 161 includes a type element 162D allowing a user to select the particular type.

The preferences region 160 includes an add preference affordance 163 which the user can activate to add a new consumption preference.

Figure 1C:
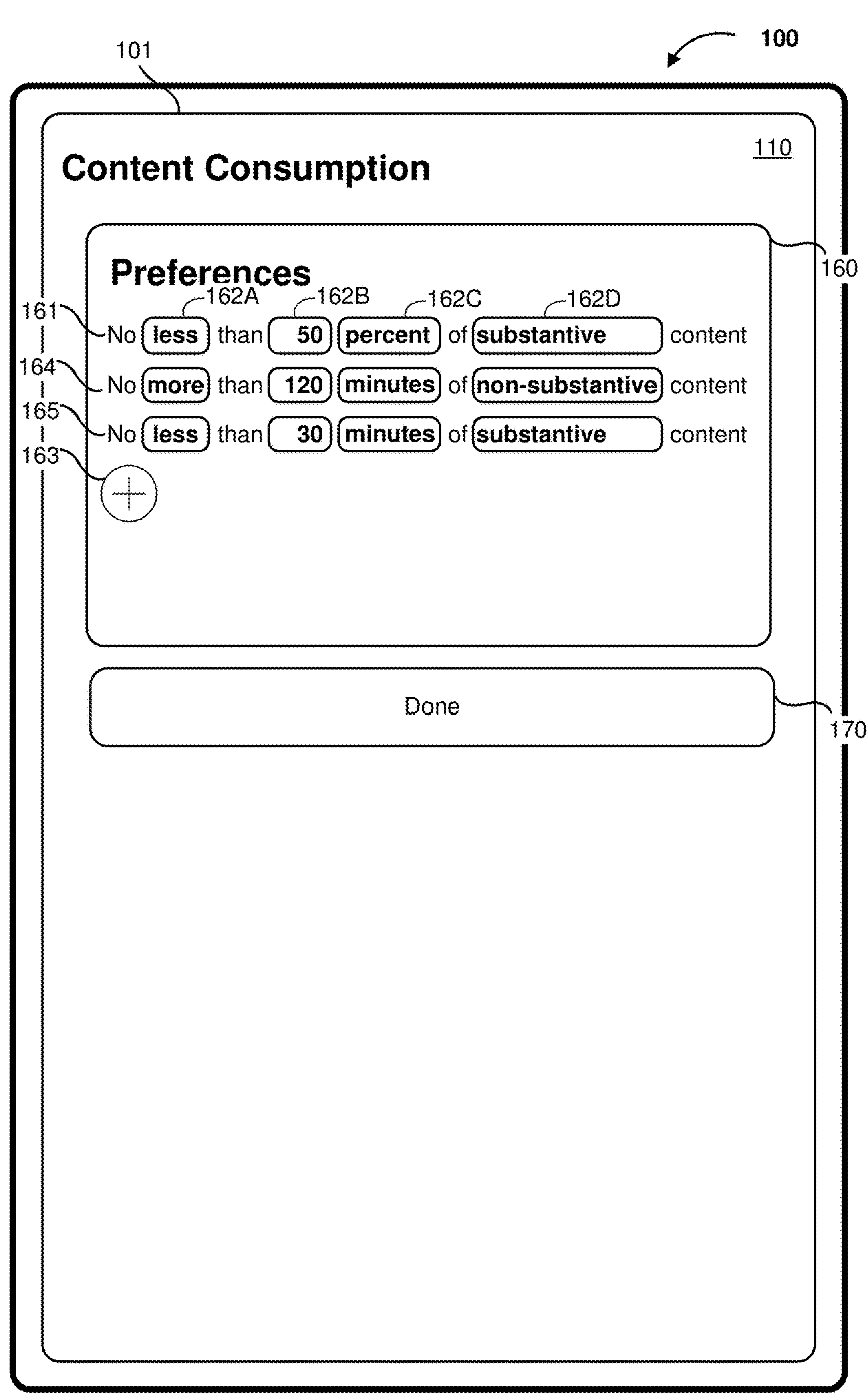

FIG. 1C illustrates the graphical user interface 110 in response to detecting activation of the add preference affordance 163, additional user input to select values for the resulting modifiable elements of a representation of a second consumption preference 164, another activation of the add preference affordance 163, and additional user input select values for the resulting modifiable elements of a representation of a third consumption preference 165.

Thus, the user has provided user input to define a second consumption preference that the amount of content of the second type consumed by the user is no more than 120 minutes a day and a third consumption preference that the amount of content of the first type consumed by the user is at least 30 minutes a day.

Figure 1D:
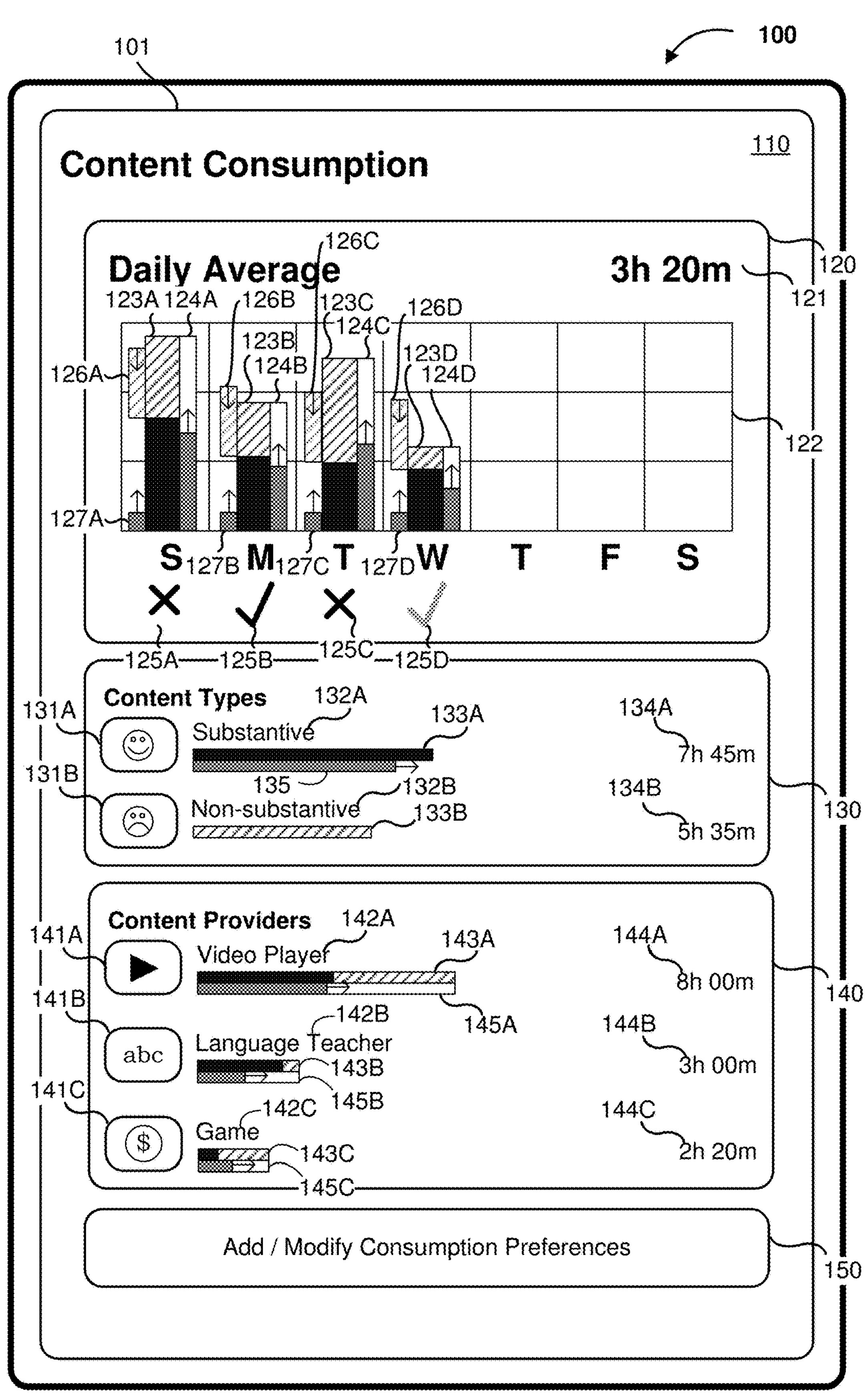

FIG. 1D illustrates the graphical user interface 110 in response to detecting activation of the done affordance 170. In FIG. 1D, the second consumption preference is represented by a plurality of second-type daily consumption value sidebars 126A-126D displayed in association with the daily consumption bars 123A-123D (in particular, in association with the portion corresponding to the second type of content). Each of the second-type daily consumption value sidebars 126A-126D has a size proportional to the preferred amount of the second consumption preference (e.g., 120 minutes). Each of the plurality of second-type daily consumption value sidebars 126A-126D also include an arrow pointing down to indicate that the second consumption preference specifies a less-than preference.

Thus, for example, by comparing the size of the portion corresponding to the second type of content in the first daily consumption bar 123A to the size of the first second-type daily consumption value sidebar 126A, a user can quickly determine whether the second consumption preference has been met on the first day of the current week.

In FIG. 1D, the third consumption preference is represented by a plurality of first-type daily consumption value sidebars 127A-127D displayed in association with the daily consumption bars 123A-123D (in particular, in association with the portion corresponding to the first type of content). Each of the first-type daily consumption value sidebars 127A-127D has a size proportional to the preferred amount of the third consumption preference (e.g., 30 minutes). Each of the plurality of first-type daily consumption value sidebars 127A-127D also include an arrow pointing up to indicate that the third consumption preference specifies a greater-than preference.

Thus, for example, by comparing the size of the portion corresponding to the first type of content in the first daily consumption bar 123A to the size of the first first-type daily consumption value sidebar 127A, a user can quickly determine whether the third consumption preference has been met on the first day of the current week.

Figure 2:
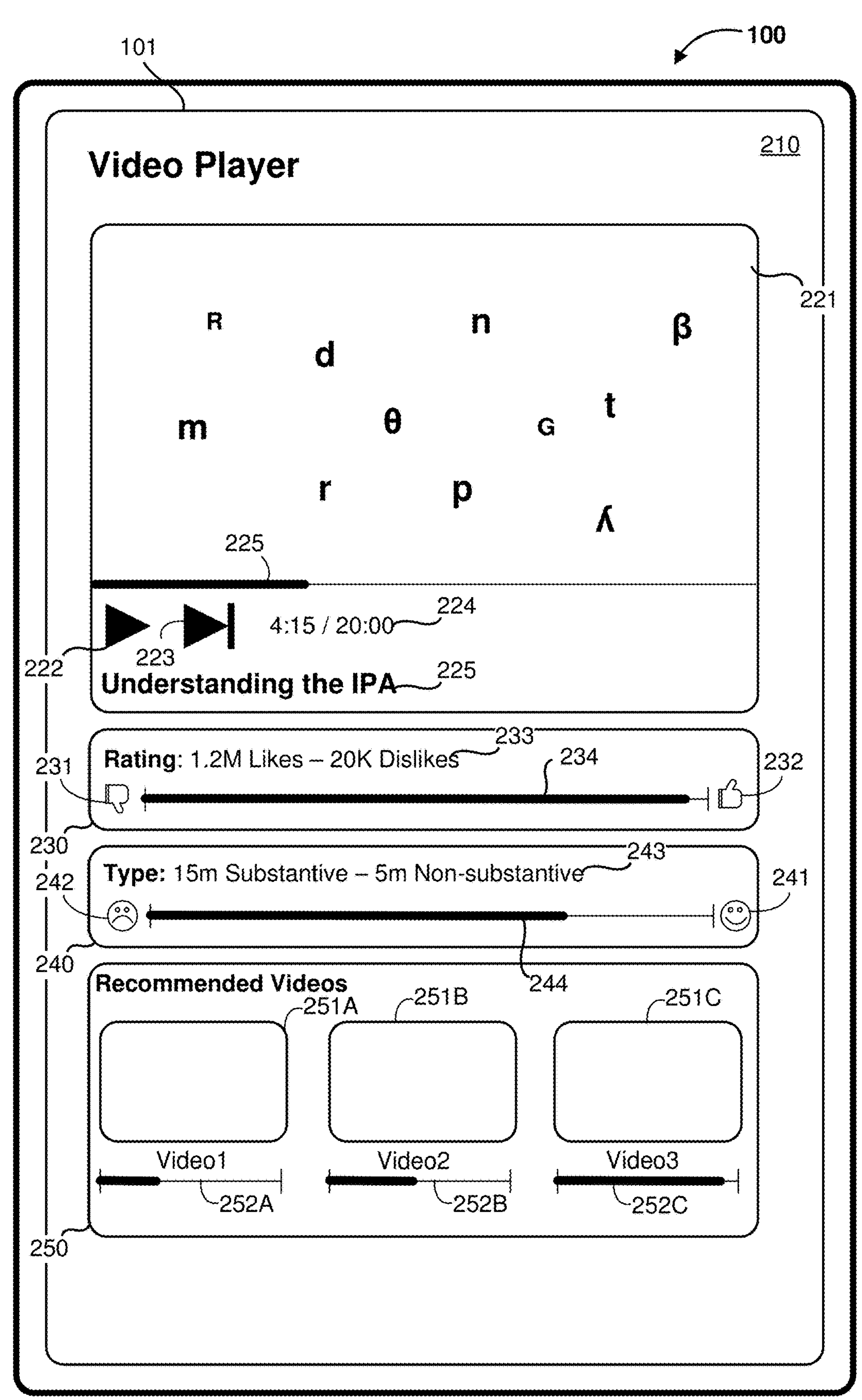
FIG. 2 illustrates a graphical user interface for consuming content from a content provider in accordance with some implementations.

FIG. 2 illustrates a graphical user interface 210 for consuming content from a content provider in accordance with some implementations. The graphical user interface 210 includes a content region 220 displaying an item of content 221. The content region 210 includes a playback affordance 222 which the user can activate to pause or resume playback of the item of content 221. The content region 220 includes a next affordance 223 which the user can activate to replace the item of content 221 with a next item of content. In various implementations, the next item of content is automatically played, without further user input, when the item of content 221 has completed playing. The content region 220 includes a playback time 224 that provides a textual representation of a current time of the item of content 221 and the total time of the item of content 221. Similarly, the content region 220 includes a time bar 225 that provides a graphical representation of the current time of the item of content 221 as compared to the total time of the item of content 221. Further, the content region 220 includes a title 225 of the item of content.

The graphical user interface 210 includes a rating region 230 indicating user-provided ratings of the item of content 221. To that end, the rating region 230 includes a dislike affordance 231 which when selected by the user adds to the negative rating of the item of content 221 and a like affordance 232 which when selected by the user adds to the positive rating of the content 221. The rating region 230 includes a rating count 233 that provides a textual representation of the number of positive and negative ratings of the item of content 221. Similarly, the rating region 230 includes a rating bar 234 that provides a graphical representation of the number of positive and negative ratings of the item of content 221.

The graphical user interface 210 includes a type region 240 indicating an amount of content of various types within the item of content 221. In various implementations, the amount of content of the various type within the item of content 221 is based on user-provided feedback. To that end, the type region 240 includes a first-type affordance 241 which when selected by the user increases the amount of content of the first type within the item of content 221 and a second-type affordance 242 which when selected by the user increases the amount of content of the second type within the item of content 221. In various implementations, the total amount of content is fixed, e.g., by a total time of the item of content 221. Thus, in various implementations, selecting the first-type affordance 241 or second-type affordance 242 increases the percent of content of the respective type within the item of content. The type region 240 includes a type count 243 that provides a textual representation of the amount of each type of content within the item of content 221. Similarly, the type region 240 includes a type bar 244 that provides a graphical representation of the amount of each type of content within the item of content 221.

The graphical user interface 210 includes a recommended region 250 displaying representations of a recommended item of content 251A-251C. The representations of a recommended item of content 251A-251C are respectively associated with representation of the type bar 252A-252C of the recommended items of content, each indicating the amount of each type of content within the corresponding recommended item of content.

In various implementations, the electronic device 100 transmits, to the content provider, data indicative of the one or more content consumption preferences. Accordingly, in various implementations, the content provider selects the recommended items of content based on the one or more content consumption preferences provided by the user. Similarly, in various implementations, the content provider selects the next item of content (e.g., displayed in response to activate of the next affordance 223) based on the one or more content consumption preferences provided by the user.

Further, the electronic device 100 receives, from the content provider, data indicative of the amount of content of each type from the content provider consumed by the user. Based on this data, the electronic device 100 determines the feedback displayed in the graphical user interface 110 of FIG. 1D. By looking at the providers region 140 of the graphical user interface 110, the user can determine how well various content providers are at selecting (and providing) content that meets the one or more content preferences. Further, the user can choose to consume more content from those content provider that select (and provide) content that meets the one or more content preferences. Thus, content providers are incentivized to select (and provide) content that meets the one or more content preferences.

Figure 3:
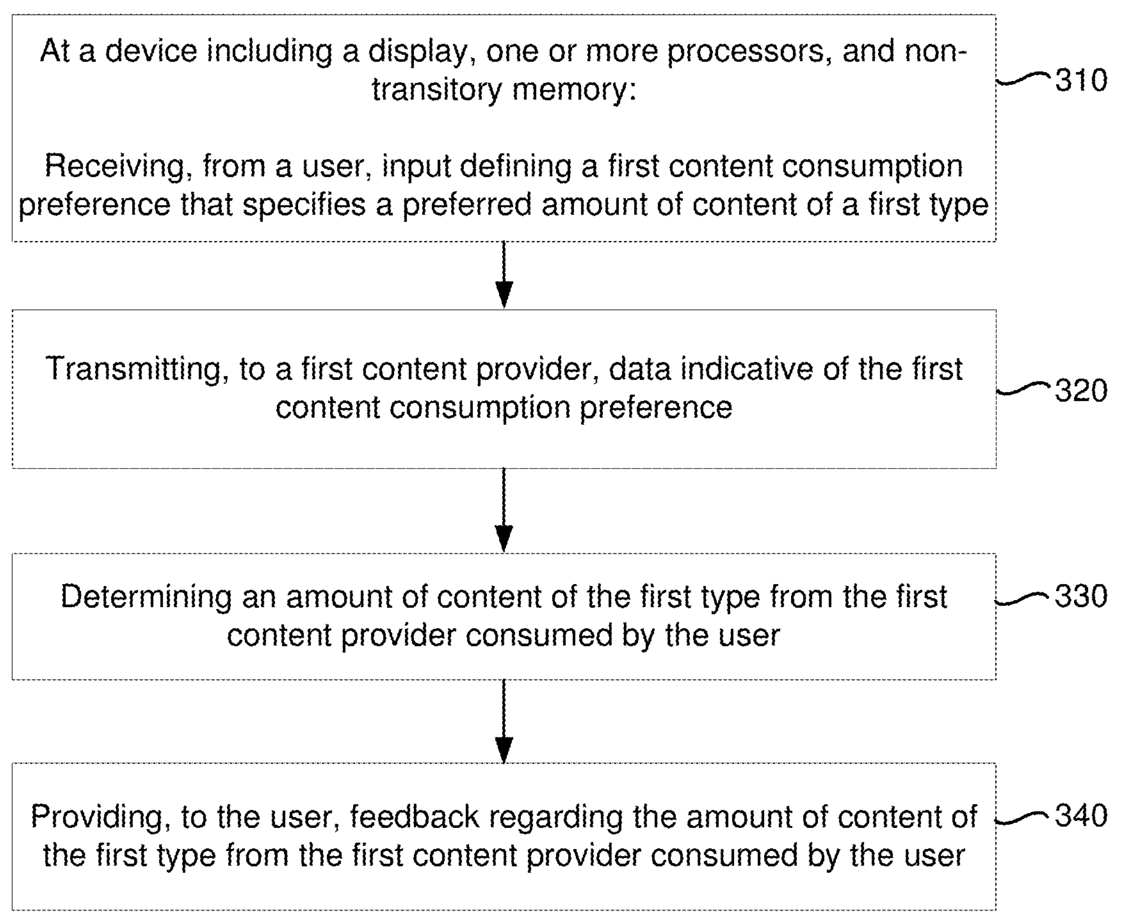
FIG. 3 is a flowchart representation of a method of providing feedback regarding content consumption in accordance with some implementations.

FIG. 3 is a flowchart representation of a method 300 of providing feedback regarding content consumption in accordance with some implementations. In various implementations, the method 300 is performed by a device with a display, one or more processors, and non-transitory memory. In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the device receiving user input defining a first content consumption preference that specifies a preferred amount of content of a first type. In various implementations, the first content consumption preference specifies a range less than the preferred amount of content of the first type. For example, a content consumption preference could specify that the amount of music videos is preferably below 30 minutes a day. In various implementations, the first content consumption preference specifies a range greater than the preferred amount of content of the first type. For example, a content consumption preference could specify that the amount of language learning is preferably at least 5 lessons a day. In various implementations, the first content consumption preference specifies a preferred percentage of the amount of content of the first type. For example, in various implementations, a content consumption preference could specify that the amount of political news articles is preferably less than 25 percent. In various implementations, the first content consumption preference specifies a preferred absolute value of the amount of content of the first type. For example, in various implementations, a content consumption preference could specify that the amount of math tutoring videos is preferably above 3 hours a week.

In various implementations, the device receives user input defining a second content consumption preference. In various implementations, the second content consumption preference specifies a preferred amount of content of a second type. For example, a pair of content consumption preferences could specify that the amount of substantive content is preferably above 50 percent and the amount of non-substantive content is preferably less than 60 minutes a day. In various implementations, the second content consumption preference specifies an additional preferred amount of content of the first type. For example, a pair of content consumption preferences could specify that the amount of educational content is preferably above 50 percent and at least 20 minutes a day.

The method 300 continues, in block 320, with the device transmitting, to a first content provider, data indicative of the first content consumption preference. In various implementations, the device transmits the data indicative of the first content consumption preference without transmitting user-identifying data. Thus, in various implementations, transmitting the data includes transmitting the data via an application of the content provider or a webpage of the content provider. Further, the user consumes content from the content provider via the application or the webpage.

In various implementations, the device transmits data indicative of a second content consumption preference (or any number of content consumption preferences) to the first content provider. In various implementations, the device transmits the data indicative of the first content consumption preference to a second content provider (or any number of content providers).

The method 300 continues, in block 330, with the device determining an amount of content of the first type from the first content provider consumed by the user. In various implementations, determining the amount of content of the first type from the first content provider consumed by the user includes determining an amount of time spent by the user consuming content of the first type from the first content provider. For example, in various implementations, determining an amount of content consumed by the user includes determining an amount of time spent reading text, viewing an image, listening to audio, watching video, or playing a game. In various implementations, determining an amount of content of a first type consumed by the user includes assigning, for each consumed item of content, a percentage of the item of content that is of first type, multiplying that assigned weight by an amount of time the item was consumed, and summing the results. It is to be appreciated that the percentage does not necessarily correspond to a certain percentage of words, pixels, or time samples, but a percentage of the item as a whole. For example, a first VR video game may be 50 percent fitness and 50 percent entertainment and a second VR video game may be 90 percent fitness and 10 percent entertainment. As another example, a first math video (explaining how to factor quadratic equations) may be 90 percent education and 10 percent entertainment and a second math video (explaining knot theory) may be 30 percent education and 70 percent entertainment.

In various implementations, determining the amount of content of the first type from the first content provider consumed by the user includes determining a number of items of content of the first type from the first content provider consumed by the user. For example, in various implementations, determining an amount of content consumed by the user includes determining number of articles read, a number of images viewed, a number of audio files listened to, a number of videos watched, or a number of game levels played. In various implementations, determining an amount of content of a first type consumed by the user includes assigning, for each consumed item of content, a percentage of the item of content that is of first type and summing the results.

In various implementations, the device determines an amount of content of the second type (or any number of types) from the first content provider consumed by the user. In various implementations, the device determines an amount of content of the first type from the second content provider (or any number of content providers) consumed by the user.

The method 300 continues, in block 340, with the device providing, to the user, feedback regarding the amount of content of the first type from the first content provider consumed by the user. For example, the graphical user interface 110 of FIGS. 1A-1D provides feedback regarding the amount of content of various types from various content providers.

In various implementations, providing feedback includes displaying a first content provider amount indicator indicating the amount of content of the first type from the first content provider consumed by the user. For example, in FIG. 1D, the device 100 displays, in the providers region the first provider consumption bar 143A and the textual representation of the amount of content from the first content provider 144A. The size of the portion of the first provider consumption bar 143A corresponding to content of the first type (and the text of the textual representation of the amount of content from the first content provider 144A) indicates the amount of content of the first type from the first content provider consumed by the user.

In various implementations, providing feedback further includes displaying, in association with the first content provider amount indicator, a representation of the first content consumption preference. For example, in FIG. 1D, the device 100 displays, in association with the first provider consumption bar 143A, the first provider consumption sidebar 145A representing the first content consumption preference.

In various implementations, providing feedback includes displaying a second content provider amount indicator indicating the amount of content of the first type from a second content provider consumed by the user. For example, in FIG. 1D, the device 100 displays, in the providers region 140, the second provider consumption bar 143B.

In various implementations, providing feedback includes displaying a total amount indicator indicating the total amount of content of the first type consumed by the user from the first content provider and other providers. For example, in FIG. 1D, the device 100 displays, in the days region 120, the plurality of daily consumption bars 123A-123D. As another example, in FIG. 1D, the device 100 displays, in the types region 130, the first type consumption bar 133A and the textual representation of the amount of content of the first type 134A.

In various implementations, providing feedback further includes displaying, in association with the total amount indicator, a representation of the first content consumption preference. For example, in FIG. 1D, the device 100 displays, in the days region 120, the plurality of first-type daily consumption percent sidebars 124A-124D. As another example, in FIG. 1D, the device 100 displays, in the types region 130, the type consumption sidebar 135. In various implementations, providing feedback further includes displaying, in association with the total amount indicator, a representation of a second content consumption preference that specifies a preferred amount of content of a second type. For example, in FIG. 1D, the device 100 displays, in the days region 120, the plurality of second-type daily consumption amount sidebars 126A-126D. In various implementations, providing feedback includes displaying an indication of whether the first content consumption preference is met. For example, in FIG. 1A, the device 100 displays, in the days region 120, the plurality of consumption checks 125A-125D.

Figure 4:
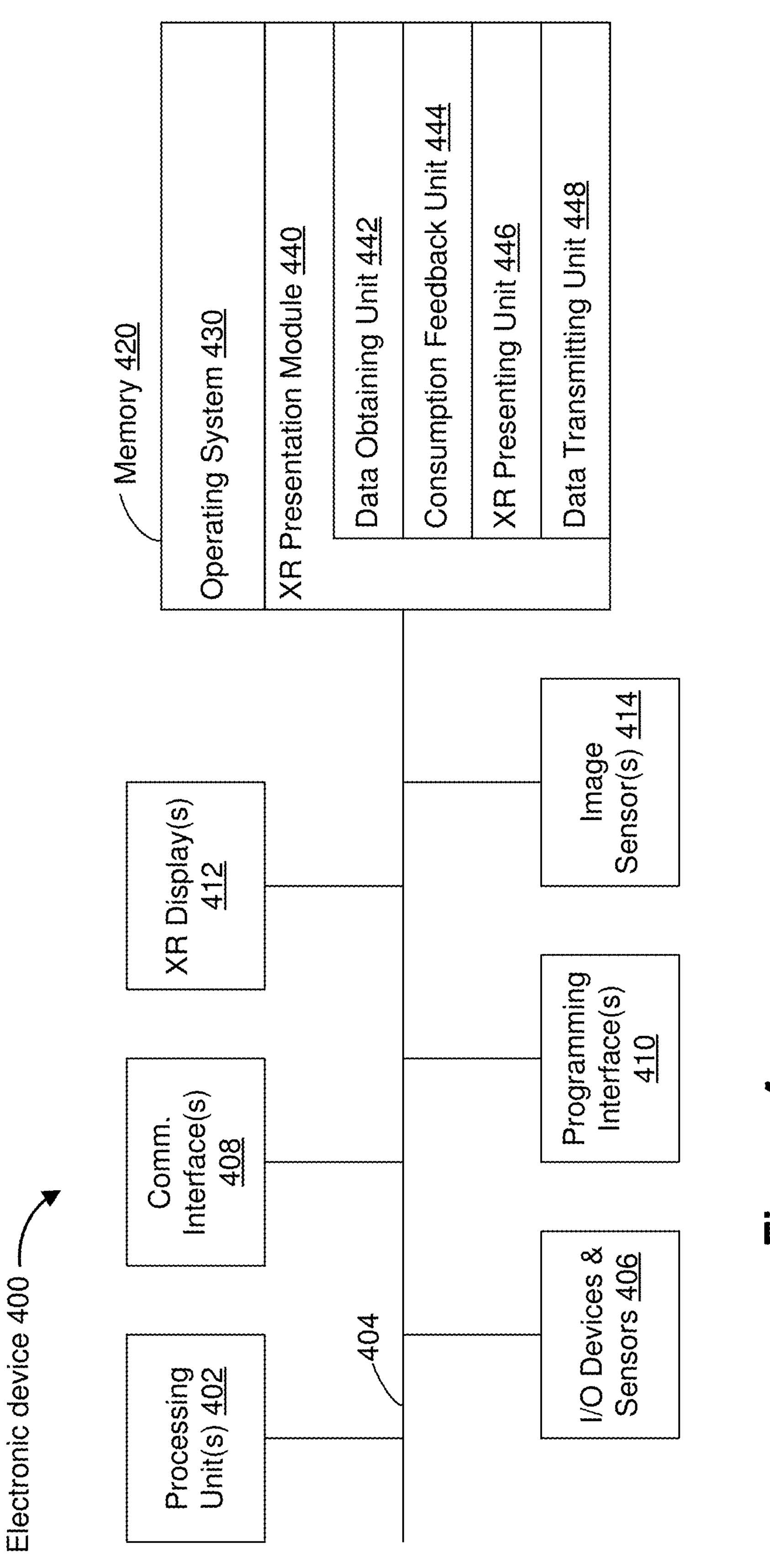
FIG. 4 is a block diagram of an electronic device in accordance with some implementations.

FIG. 4 is a block diagram of an electronic device 400 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 400 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, one or more XR displays 412, one or more optional interior- and/or exterior-facing image sensors 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 412 are configured to present XR content to the user. In some implementations, the one or more XR displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 412 correspond to diffractive, reflective, polarized, holographic, etc. waveguide displays. For example, the electronic device 400 includes a single XR display. In another example, the electronic device 400 includes an XR display for each eye of the user. In some implementations, the one or more XR displays 412 are capable of presenting AR, MR, and/or VR content.

In various implementations, the one or more XR displays 412 are video passthrough displays which display at least a portion of a real scene as an image captured by a scene camera. In various implementations, the one or more XR displays 412 are optical see-through displays which are at least partially transparent and pass light emitted by or reflected off the real scene.

In some implementations, the one or more image sensors 414 are configured to obtain image data that corresponds to at least a portion of the face of the user that includes the eyes of the user (any may be referred to as an eye-tracking camera). In some implementations, the one or more image sensors 414 are configured to be forward-facing so as to obtain image data that corresponds to the physical environment as would be viewed by the user if the electronic device 400 was not present (and may be referred to as a scene camera). The one or more optional image sensors 414 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and an XR presentation module 440.

The operating system 430 includes procedures for handling various basic system services and for performing hardware dependent tasks. In some implementations, the XR presentation module 440 is configured to present XR content to the user via the one or more XR displays 412. To that end, in various implementations, the XR presentation module 440 includes a data obtaining unit 442, a consumption feedback unit 444, an XR presenting unit 446, and a data transmitting unit 448.

In some implementations, the data obtaining unit 442 is configured to obtain data (e.g., presentation data, interaction data, sensor data, location data, etc.). The data may be obtained from the one or more processing units 402 or another electronic device. To that end, in various implementations, the data obtaining unit 442 includes instructions and/or logic therefor, and heuristics and metadata therefor.

In some implementations, the consumption feedback unit 444 is configured to provide feedback regarding a user's consumption of content. To that end, in various implementations, the consumption feedback unit 444 includes instructions and/or logic therefor, and heuristics and metadata therefor.

In some implementations, the XR presenting unit 446 is configured to present XR content via the one or more XR displays 412. To that end, in various implementations, the XR presenting unit 446 includes instructions and/or logic therefor, and heuristics and metadata therefor.

In some implementations, the data transmitting unit 448 is configured to transmit data (e.g., presentation data, location data, etc.) to the one or more processing units 402, the memory 420, or another electronic device. To that end, in various implementations, the data transmitting unit 448 includes instructions and/or logic therefor, and heuristics and metadata therefor.

Although the data obtaining unit 442, the consumption feedback unit 444, the XR presenting unit 446, and the data transmitting unit 448 are shown as residing on a single electronic device 400, it should be understood that in other implementations, any combination of the data obtaining unit 442, the consumption feedback unit 444, the XR presenting unit 446, and the data transmitting unit 448 may be located in separate computing devices.

Moreover, FIG. 4 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device with a display, one or more processors, and non-transitory memory:

receiving, from a user, input defining a first content consumption preference that specifies a preferred amount of content of a first type;

transmitting, to a first content provider, data indicative of the first content consumption preference, wherein each item from the first content provider has content of multiple types;

determining an amount of content of the first type from the first content provider consumed by the user; and providing, to the user, feedback regarding the amount of content of the first type from the first content provider consumed by the user.

2. The method of claim 1, wherein the first content consumption preference specifies a range less than the preferred amount of content of the first type.

3. The method of claim 1, wherein the first content consumption preference specifies a range greater than the preferred amount of content of the first type.

4. The method of claim 1, wherein the first content consumption preference specifies a preferred percentage of the amount of content of the first type.

5. The method of claim 1, wherein the first content consumption preference specifies a preferred absolute value of the amount of content of the first type.

6. The method of claim 1, wherein determining the amount of content of the first type from the first content provider consumed by the user includes determining an amount of time spent by the user consuming content of the first type from the first content provider.

7. The method of claim 1, wherein determining the amount of content of the first type from the first content provider consumed by the user includes determining a number of items of content of the first type from the first content provider consumed by the user.

8. The method of claim 1, wherein providing feedback includes displaying a first content provider amount indicator indicating the amount of content of the first type from the first content provider consumed by the user.

9. The method of claim 8, wherein providing feedback further includes displaying, in association with the first content provider amount indicator, a representation of the first content consumption preference.

10. The method of claim 8, wherein providing feedback includes displaying a second content provider amount indicator indicating the amount of content of the first type from a second content provider consumed by the user.

11. The method of claim 1, wherein providing feedback includes displaying a total amount indicator indicating the total amount of content of the first type consumed by the user from the first content provider and other content providers.

12. The method of claim 11, wherein providing feedback further includes displaying, in association with the total amount indicator, a representation of the first content consumption preference.

13. The method of claim 12, wherein providing feedback further includes displaying, in association with the total amount indicator, a representation of a second content consumption preference that specifies a preferred amount of content of a second type.

14. The method of claim 1, wherein providing feedback includes displaying an indication of whether the first content consumption preference is met.

15. A device comprising:

a display;

non-transitory memory; and one or more processors to:

receive, from a user, input defining a first content consumption preference that specifies a preferred amount of content of a first type;

transmit, to a first content provider, data indicative of the first content consumption preference, wherein each item from the first content provider has content of multiple types;

determine an amount of content of the first type from the first content provider consumed by the user; and provide, to the user, feedback regarding the amount of content of the first type from the first content provider consumed by the user.

16. The device of claim 15, wherein the one or more processors are to provide feedback by displaying a first content provider amount indicator indicating the amount of content of the first type from the first content provider consumed by the user.

17. The device of claim 16, wherein the one or more processors are to provide feedback by displaying, in association with the first content provider amount indicator, a representation of the first content consumption preference.

18. The device of claim 15, wherein the one or more processors are to provide feedback by displaying a total amount indicator indicating the total amount of content of the first type consumed by the user from the first content provider and other content providers.

19. The device of claim 15, wherein the one or more processors are to provide feedback by displaying an indication of whether the first content consumption preference is met.

20. A non-transitory memory storing one or more programs, which, when executed by one or more processors of a device including a display, cause the device to:

receive, from a user, input defining a first content consumption preference that specifies a preferred amount of content of a first type;

transmit, to a first content provider, data indicative of the first content consumption preference, wherein each item from the first content provider has content of multiple types;

determine an amount of content of the first type from the first content provider consumed by the user; and provide, to the user, feedback regarding the amount of content of the first type from the first content provider consumed by the user.

* * * * *